INVENTORS
ROBERT L. GOLDEN
HARVEY J. SHOPSKY

Nov. 19, 1968  R. L. GOLDEN ETAL  3,411,522

VACUUM REGULATOR MEANS AND PARTS THEREFOR

Filed Dec. 27, 1966  3 Sheets-Sheet 2

INVENTORS
ROBERT L. GOLDEN
HARVEY J. SHOPSKY

BY

THEIR ATTORNEYS

Nov. 19, 1968 R. L. GOLDEN ETAL 3,411,522

VACUUM REGULATOR MEANS AND PARTS THEREFOR

Filed Dec. 27, 1966 3 Sheets-Sheet 3

INVENTORS
ROBERT L. GOLDEN
HARVEY J. SHOPSKY

BY

*Cauder & Cauder*

THEIR ATTORNEYS

3,411,522
VACUUM REGULATOR MEANS AND PARTS THEREFOR

Robert L. Golden, 151 Chestnut Drive, Greensburg, Pa. 15601, and Harvey J. Shopsky, R.D. 31, Box 371, Latrobe, Pa. 15650
Filed Dec. 27, 1966, Ser. No. 604,733
24 Claims. (Cl. 137—116.5)

ABSTRACT OF THE DISCLOSURE

This invention relates to improved means for selectively adjusting a vacuum regulator within its limits to tend to maintain a selected vacuum condition in a vacuum operated actuator interconnected to such regulator, the improved adjusting means of this invention permitting accurate and infinite selection for the desired vacuum condition with the adjusting means having utility in arts other than the vacuum regulator field.

---

It is well known from the United States patent to Houser, No. 3,221,991, that a vacuum regulator can comprise a housing means having a chamber interconnected to a vacuum source, such as a vacuum pump, by a first passage means and to an actuating chamber of a vacuum operated actuator by another passage means, the housing means carrying a flexible diaphragm or the like for opening and closing the vacuum source passage means to tend to maintain a particular vacuum condition in the chamber of the regulator as set by a selector means whereby the degree of actuation of the actuator can be preselected.

This invention provided improved means for permitting the operator to infinitely and accurately select the desired degree of the vacuum condition to be maintained by such a regulator or the like within the limits of the adjusting means.

In particular, the improved adjusting means of this invention includes a rotatable selector means carried by the regulator and being splined to a movable member to cause rotation of the movable member in unison therewith while the movable member is axially moved relative to the housing to vary the degree of an urging means tending to close the vacuum source passage means, the movable member cooperating with a fixed member in such a manner that the members produce a camming action therebetween at a point radially spaced from the axis of rotation of the movable member to accurately and infinitely vary the degree of the vacuum condition to be maintained by the regulator.

Accordingly, it is an object of this invention to provide a vacuum regulator or the like having one or more of the novel features set forth above or hereinafter shown or described.

Another object of this invention is to provide improved adjusting means for a vacuum regulator or the like.

Other objects, uses and advantages of this invention are apparent from a reading of this description which proceeds with reference to the accompanying drawings forming a part thereof and wherein.

Figure 1:
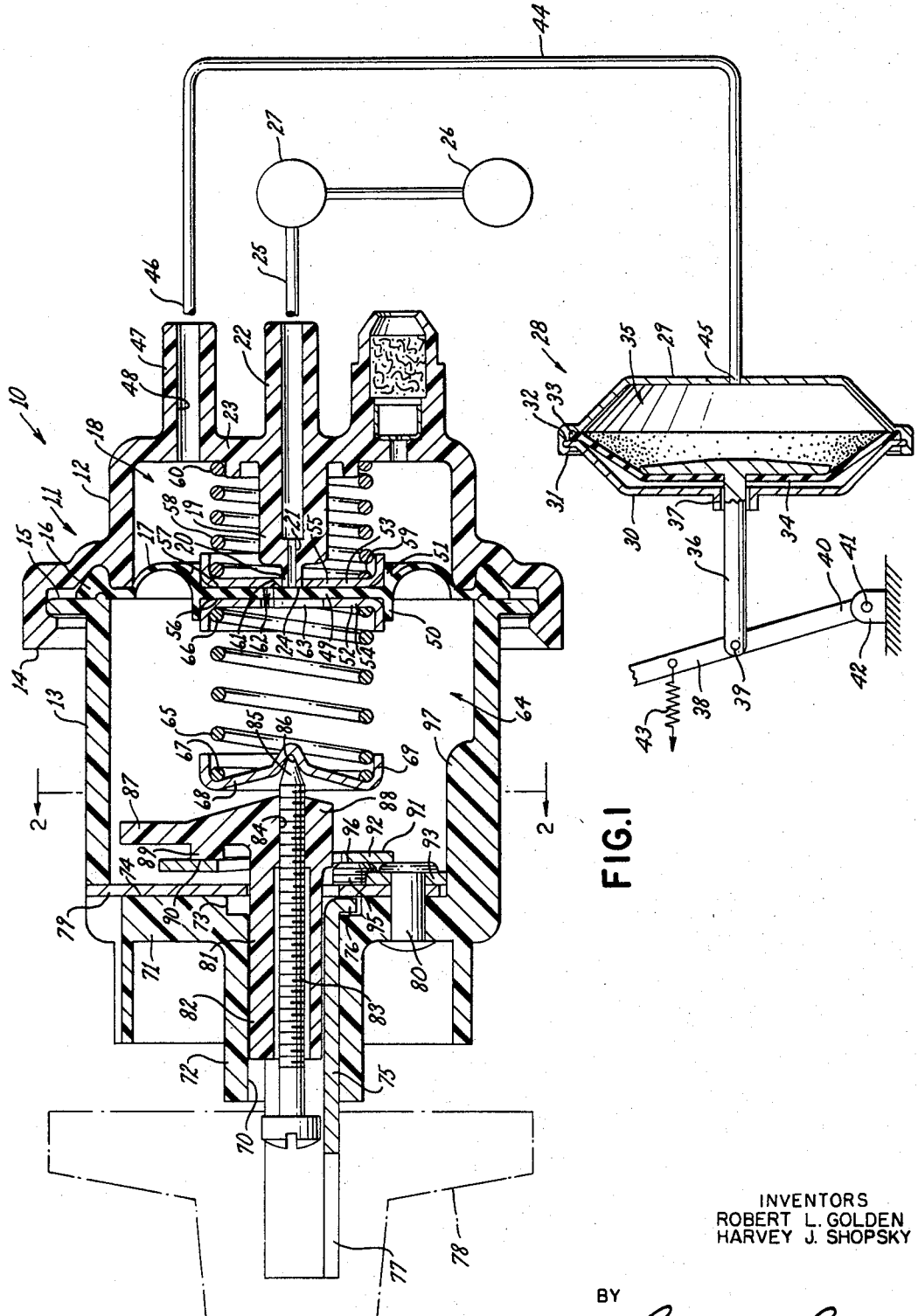
FIGURE 1 is a cross-sectional view of one vacuum regulator means of this invention.

While the various features of this invention are hereinafter described and illustrated as being particularly adaptable for providing adjusting means for a vacuum regulator or the like, it is to be understood that the various features of this invention can be utilized singly or in any combination thereof to provide adjusting means for other devices as desired.

Therefore, this invention is not to be limited to only the embodiments illustrated in the drawings, because the drawings are utilized to illustrate one of the wide variety of uses of this invention.

Referring now to FIGURE 1, an improved vacuum regulator means of this invention is generally indicated by the reference numeral 10 and comprises a housing means 11 formed from a pair of cup-shaped housing members 12 and 13 snap fitted together at their respective open ends 14 and 15 to hold and secure an outer peripheral means 16 of a flexible diaphragm 17 therebetween whereby the diaphragm 17 cooperates with the housing member 12 to define a chamber 18 therebetween.

The housing member 12 has an inwardly directed, central extension 19 terminating at a reduced free end 20 thereof that is interrupted by a passage means 21 extending completely through the extension 19 and an outwardly directed, central extension 22 extending from the bottom wall 23 of the cup-shaped housing member 12. In this manner, the passage means 21 cooperates with the free end 20 of the extension 19 to define a flat valve seat 24 adapted to interconnect the passage means 21 with the chamber 18 for a purpose hereinafter described.

The extension 22 of the housing means 12 is adapted to be interconnected to a flexible conduit means 25 or the like, such as by having the end of the conduit means 25 press-fitted over the extension 22 to place the conduit means 25 in fluid communication with the passage means 21. The conduit means 25 can be disposed in fluid communication with a vacuum source 26, such as the inlet side of a vacuum pump or the like, and a selector means or program means 27 can be disposed intermediate the regulator 10 and the vacuum source 26 to only permit the vacuum source 26 to be interconnected to the passage 21 when the selector means 27 is in a preset position. For example, the selector means 27 can comprise a program means or the like which will only permit the regulator means 10 to control the operation of a vacuum operated actuator means 28 during a predetermined portion of a particular cycle of operation of the apparatus utilizing the actuator means 28.

The actuator means 28 illustrated in FIGURE 1 comprises a pair of cup-shaped housing members 29 and 30 snap-fitted together at their respective open ends 31 and 32 to hold and secure the outer peripheral means 33 of a flexible diaphragm 34 therebetween whereby the diaphragm 34 cooperates with the cup-shaped housing member 29 to define a chamber 35 therebetween.

The flexible diaphragm 34 can carry an actuating post 36 which projects outwardly through an opening means 37 in the cup-shaped member 30 to be pivotally connected to a lever 38 by a pivot pin 39, the lever 38 having one end 40 pivotally mounted by a pivot pin 41 to a stationary frame means 42 and normally being pivoted to the position illustrated in FIGURE 1 by a tension spring means 43 in a manner well known in the art.

The chamber 35 of the actuator 28 is adapted to be disposed in fluid communication with the chamber 18 of the regulator means 10 of this invention by a flexible conduit means 44 or the like having one end 45 disposed in fluid communication with the chamber 35 of the actuator 28 and the other end 46 adapted to be telescoped onto another extension 47 projecting outwardly from the bottom wall 23 of the cup-shaped housing 12 of the regulator means 10 so as to be disposed in fluid communication with a passage means 48 passing through the extension 47 as illustrated.

The flexible diaphragm 17 of the regulator 10 has a central, circular and substantially flat portion 49 defined by a pair of oppositely directed annular rib means 50 and 51 extending in opposite directions therefrom and respectively providing guide means for receiving cup-shaped retainers 52 and 53 respectively having substantially flat end walls 54 and 55 disposed against the opposed sides 56 and 57 of the central portion 49 of the diaphragm 17.

A compression spring 58 is disposed in the chamber 18 and has one end 59 disposed against the cup-shaped retainer 53 and the other end 60 disposed against the end wall 23 of the cup-shaped housing member 12 whereby the force of the compression spring 58 tends to move the flexible diaphragm 17 away from the valve seat 24 for a purpose hereinafter described, the cup-shaped retainer 53 having a central opening 61 passing through the bottom wall 55 thereof to permit the free end 20 of the extension 19 of the housing member 12 to be fully telescopically received therethrough and be sealed closed by the central portion 49 of the diaphragm 17 in the manner illustrated in FIGURE 1 for a purpose hereinafter described. The opening means 61 in the cup-shaped retainer 53 has a substantially frusto-conical cross-sectional configuration as illustrated in FIGURE 1 with the larger base thereof facing the extension 19 to facilitate telescoping of the free end 20 of the extension 19 therein during movement of the diaphragm 17 relative thereto in a manner hereinafter described.

The central portion 49 of the flexible diaphragm 17 has an aperture 62 passing therethrough in offset relation relative to the opening 61 of the retainer 53 so that when the diaphragm 17 is disposed in the position illustrated in FIGURE 1, the retainer 53 completely seals off fluid communication between the aperture 62 of the diaphragm 17 and the chamber 18 for a purpose hereinafter described.

The cup-shaped retainer 52 has an enlarged opening 63 passing through the bottom wall 54 thereof and being of a size to always permit fluid communication between the aperture 62 of the diaphragm 17 and a chamber means 64 defined by the cup-shaped housing member 13. In this manner, the chamber 64 of the regulator 10 is always disposed in fluid communication with the aperture 62 of the diaphragm 17 and the chamber 64 is adapted to be interconnected to the atmosphere in any suitable manner, such as by an opening means passing through the cup-shaped housing 13 or through a loose fit of the adjusting means with the housing 13 in a manner later to be described.

A compression spring or urging means 65 is disposed in the chamber 64 of the housing means 11 and has one end 66 disposed against the bottom wall 54 of the cup-shaped retainer 52 and the other end 67 thereof received against a bottom wall 68 of another cup-shaped retainer 69 which is adapted to be axially positioned in the chamber 64 by the adjusting means of this invention to vary the force of the compression spring 65 tending to urge the diaphragm 17 toward the extension 19 in opposition to the force of the compression spring 58 for a purpose hereinafter described.

The housing member 13 has a stepped bore 70 formed through the closed end 71 thereof and extending through an outwardly extending central part 72, the stepped bore 70 defining an annular recess 73 adjacent the inner surface 74 of the end wall 71 of the housing member 13.

A C-shaped control shaft 75 is adapted to be telescopically disposed in the bore 70 and has an outwardly turned flanged end 76 received in the annular recess 73 while the other end 77 thereof is adapted to be interconnected to a control knob 78 or the like to rotate in unison therewith. The flanged end 76 of the control shaft 75 is adapted to be held in the recess 73 by a retaining plate 79 fastened to the end wall 71 of the housing means 13 by suitable fastening means 80. In this manner, the control shaft 75 is rotatably mounted to the housing means 11 of the regulator 10 and can have its rotational position selected by the control knob 78.

A movable member 81 is provided and has the tubular part 82 splined to the control shaft 75 in any suitable manner so that the movable member 81 will rotate in unison with the control shaft 75 while being axially movable relative thereto for a purpose hereinafter described. An adjusting screw 83 is threaded in a threaded bore 84 of the movable member 81 and has a conical end 85 adapted to be received in a conical depression 86 formed centrally in the bottom wall 68 of the retainer 69 to provide a substantially frictionless bearing point against the retainer 69 so that the movable member 81 can be rotated relative to the spring 65 without placing an adverse torque on the same.

Figure 2:
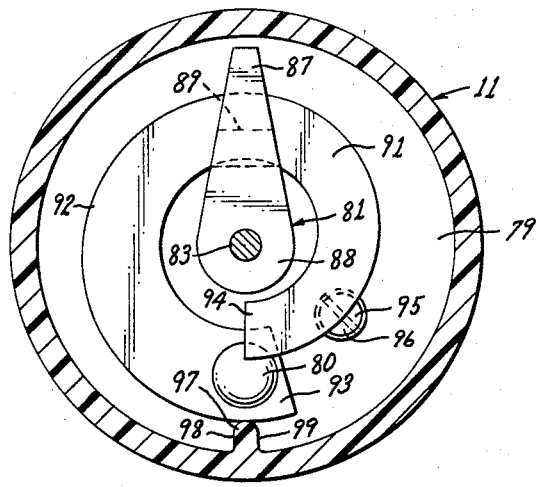
FIGURE 2 is a cross-sectional view taken on line 2—2 of FIGURE 1.

The movable member 81 has an outwardly directed tongue or portion 87 extending substantially radially outwardly of the end 88 thereof in the manner illustrated in FIGURES 1 and 2 with the tongue 87 having a right-angled projection means 89 provided with a substantially flat camming surface 90 adapted to bear against a camming surface means 91 of a fixed member 92 carried by the housing means 11.

The fixed member 91 comprises a strip of metallic material formed in a coiled manner with one end 93 being fastened against the plate 79 by the fastening means 80 illustrated in FIGURE 1 to fix the end 93 relative to the housing member 13 while the other end 94 thereof is adapted to be movable relative to the housing member 13. However, the natural resiliency of the member 91 tends to maintain the ends 93 and 94 in a coplanar relation whereby a threaded adjusting member 95 is carried by the housing member 13 and has an end 96 adapted to abut the free end 94 of the coiled cam track means or fixed member 91 in the manner illustrated in FIGURES 1 and 2 to hold the end 94 in a desired, axially spaced relation from the fixed end 93 thereof.

In this manner, it can be seen that the coiled member 91 provides a substantially circular cam track which will axially position the movable member 81 relative to the housing member 13 in accordance with the rotational position of the member 81 relative to the fixed member 91 to thereby infinitely vary the force of the compression spring 65 tending to urge the diaphragm 17 toward the extension 19 of the housing member 12.

The rotational movement of the movable member 81 is limited by an inwardly directed abutment 97 formed on the housing member 13 and defining spaced apart shoulder means 98 and 99 against which the tongue 87 of the movable member 82 will abut depending upon the direction of rotational movement of the member 82 by the selector knob 79.

Therefore, it can be seen that the vacuum regulator means 10 of this invention comprises relatively few parts adapted to be assembled together in a relatively simple manner while permitting accurate and infinite adjustment of the force of the compression spring 65 by having the cam track means 91 and bearing surface 90 of the movable member 82 disposed at a relatively large radial distance from the axis of rotation of the member 81 to adjust the setting of the regulator means 10 in a manner now to be described.

The operator or the like can rotate the control knob 78 to a desired indicating setting thereof and such rotation of the control knob 78 causes simultaneous rotation of the control shaft 75 and movable member 81 whereby the axial position of the member 81 is controlled by its rotational position relative to the fixed cam track 91. When the rotatable member 81 has been disposed in a selected axial position, it can be seen that the adjusting screw 83 carried thereby has caused the cup-shaped retainer 69 to be axially positioned in a preset position relative to the casing member 13 to set the force of the compression spring 65 tending to urge the diaphragm 17 toward the extension 19 in opposition to the force of the compression spring 58.

Figure 3:
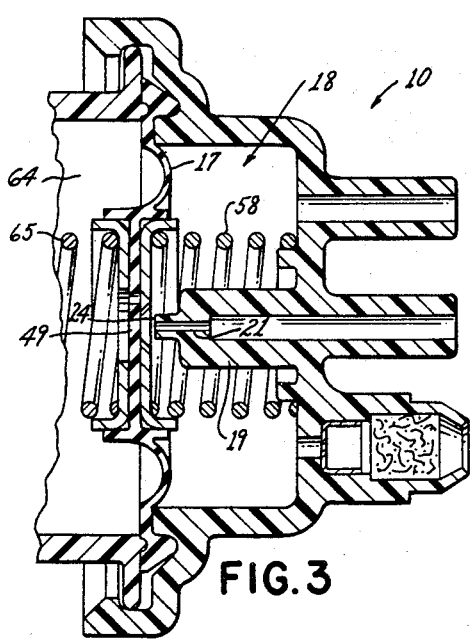
FIGURE 3 is a fragmentary view of a portion of the structure illustrated in FIGURE 1 and illustrates the vacuum regulator means in another operating position thereof.

When an atmospheric condition exists in the chamber 18 of the regulator 10 by the selector means 27 interconnecting the atmosphere to the passage means 21 and disconnecting the vacuum source 26 therefrom, the force of the compression spring 58 is greater than the force of the opposing compression spring 65 in any of its adjusted positions so that the diaphragm 17 is normally maintained in the position illustrated in FIGURE 3 with the central part 49 of the diaphragm 17 disposed away from the valve seat means 24 whereby the atmosphere is interconnected by the chamber 18 of the regulator 10 and to the chamber 35 of the actuator 28 so that the lever 38 is disposed in the position illustrated in FIGURE 1 by means of the tension spring 43.

However, when the selector means or program means 27 disconnects the atmosphere from the chamber 18 of the regulator 10 and interconnects the vacuum source 26 thereto through the passage means 21, the chamber 18 of the regulator 10 begins to be evacuated, as well as the interconnected chamber 35 of the actuator 28, until a selected vacuum condition exists in the chamber 18 as set by the control knob 78.

In particular, as the chamber means 18 of the regulator 10 is being evacuated by the source 26, the pressure differential across the diaphragm 17 progressively increases to assist the force of the compression spring 65 in urging the diaphragm 17 toward the extension 19 in opposition to the force of the compression spring 58 so that when the desired selected vacuum condition exists in the chamber 18, the diaphragm 17 is disposed in the position illustrated in FIGURE 1 and completely seals closed the passage means 21 of the extension 19 so that further evacuation of the chamber 18 cannot take place, such evacuation of the chamber 18 of the regulator 10 and the chamber 35 of the actuator 28 causing the pressure differential across the diaphragm 34 of the actuator 28 to move the diaphragm 34 to the right in FIGURE 1 and pull the lever 38 in a clockwise direction in opposition to the force of the tension spring 43 to a particular position thereof to actuate a desired structure, such as a speed control transmission means of a domestic washing machine or the like.

For example, the position of the lever 38 can set the speed of spin of the washing compartment of the washing machine whereby the position of the diaphragm 34 of the actuator 28 to the right in FIGURE 1 is controlled by the selected vacuum condition in the chamber 18 of the regulator means 10. Thus, the housewife or the like merely sets the control knob 78 to the desired speed setting thereof and the program means 27 will cause the regulator means 10 to effect positioning of the lever 38 at the desired speed setting thereof.

Figure 4:
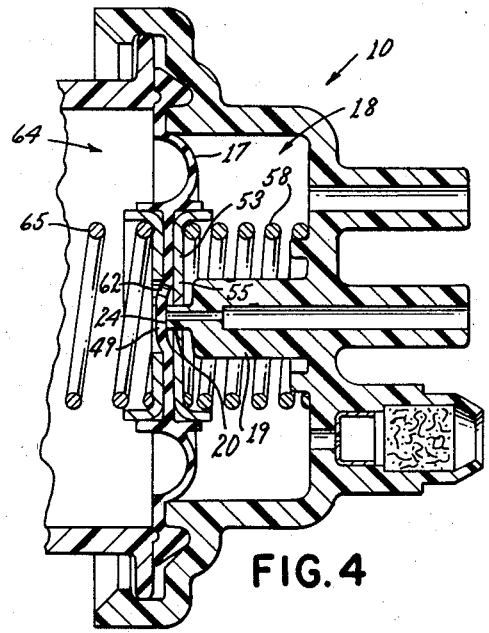
FIGURE 4 is a vew similar to FIGURE 3 and illustrates the vacuum regulator means in still another operating position thereof.

If the vacuum condition in the chamber 18 of the regulator 10 should exceed the condition selected by the knob 78, the diaphragm 17 is further moved toward the extension 19 from the position illustrated in FIGURE 1 to the position illustrated in FIGURE 4 whereby the retainer 53 is telescoped downwardly over the extension 19 and the free end 20 of the extension 19 flexes the central part 49 of the diaphragm 17 away from the retainer 53 in such a manner that the portion 49 of the diaphragm 17 carrying the aperture 62 is moved away from sealing relationship with the end wall 55 of the retainer 53 to permit fluid communication between the chamber 64 of the regulator 10 and the chamber 18 as illustrated in FIGURE 4 to reduce the degree of vacuum in the chamber 18 until the vacuum condition in the chamber 18 again reaches the selected condition so that the diaphragm 17 will again be disposed in the position illustrated in FIGURE 1 and have the aperture 62 sealed closed by the retainer 53.

Conversely, should the vacuum condition in the chamber 18 decrease from the selected condition as illustrated in FIGURE 1, the reduced pressure differential across the diaphragm 17 will cause the compression spring 58 to move the diaphragm 17 away from the valve seat 24 of the extension 19 in the manner illustrated in FIGURE 3 to permit the vacuum source 26 to again be interconnected to the chamber 18 for further evacuation thereof until the selected condition is reached whereby the diaphragm 17 will be in the position illustrated in FIGURE 1.

Therefore, it can be seen that should the vacuum condition of the chamber 18 change from the selected condition thereof due to various reasons, the regulator 10 will either connect the vacuum source 26 or the atmosphere to the chamber 18 in a rapid and efficient manner to correct the change in the vacuum condition in the chamber 18 back to the selected vacuum condition so that the lever 38 will remain in its selected position.

Since the regulator 10 can effectively maintain the vacuum condition in the chamber 18 in the above manner as determined by the particular set compression force of the spring 65, it can be seen that the adjusting means of this invention for infinitely varying the force of the compression spring 65 within its limits permits the operator to accurately set the regulator 10 because the camming action between the fixed member 91 and the movable member 81 takes place at a relatively large radial distance from the rotational axis of the control knob 78 and movable member 81.

While the regulator 10 has been described as having the fixed member 91 providing the cam track means against which the movable member 81 will be cammed to change its axial position, and, thus, the axial position of the retainer 69, it is to be understood that the movable member of the adjusting means of this invention can provide the cam track means, if desired.

Figure 5:
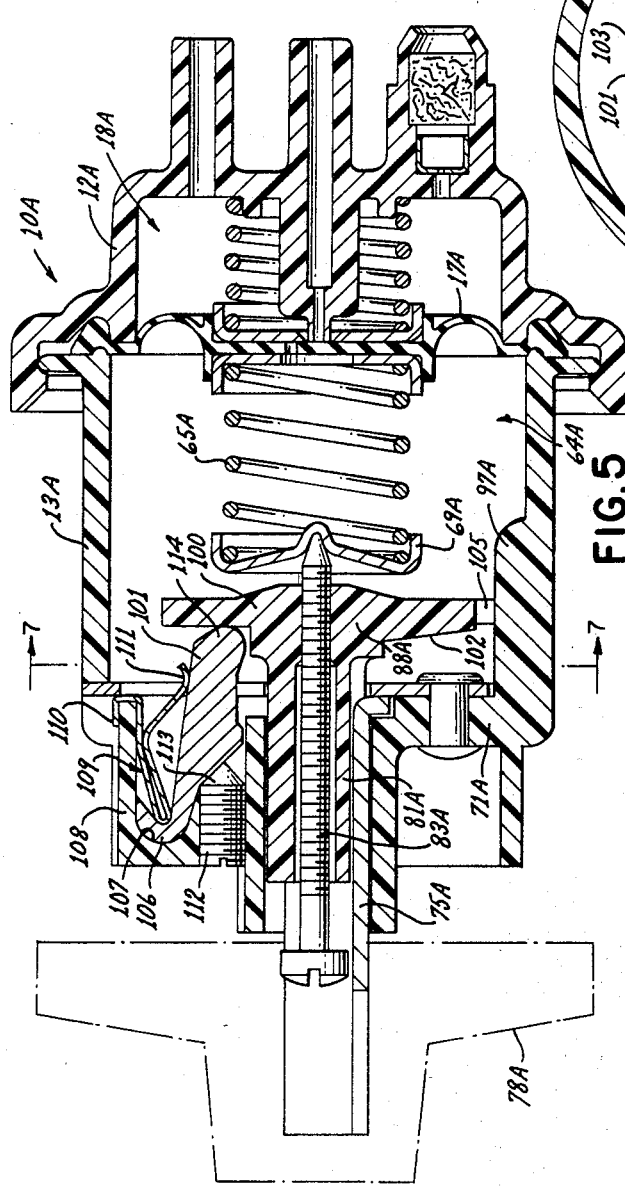
FIGURE 5 is a view similar to FIGURE 1 and illustrates another embodiment of this invention.
Figure 7:
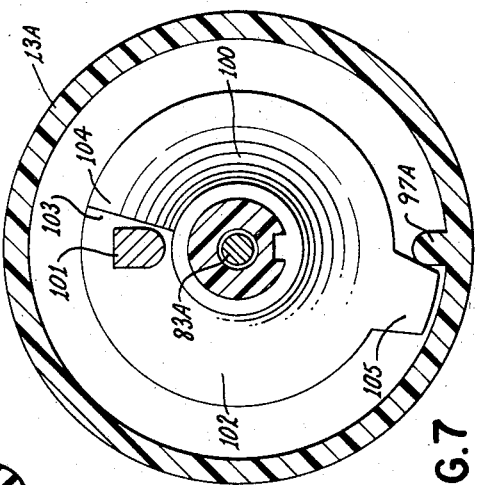
FIGURE 7 is a cross-sectional view taken on line 7—7 of FIGURE 5.
Figure 6:
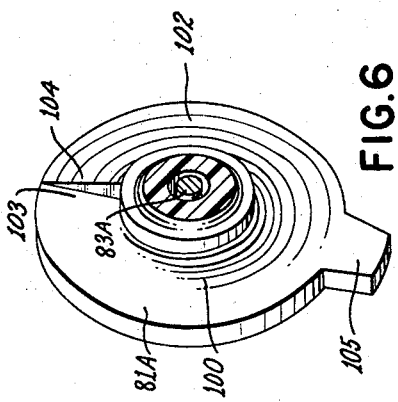
FIGURE 6 is a perspective view of one of the parts of the regulator means of FIGURE 5.

For example, another embodiment of this invention is illustrated in FIGURES 5–7 and parts thereof similar to the parts of the regulator 10 previously described are indicated by like reference numerals followed by the reference letter "A."

As illustrated in FIGURE 5, the vacuum regulator 10A is substantially identical to the regulator 10 previously described except that the movable member 81A has a disc-like cam track portion 100 at the end 88A thereof to cooperate with a fixed member 101 in a manner hereinafter described.

In particular, the movable member 81A is splined to the control shaft 75A in the manner previously described and carries the adjusting screw means 83A bearing against the cup-shaped retainer 69A urged thereagainst by the compression spring 65A. However, the disc-like portion 100 on the end 88A of the movable member 81A has the surface 102 thereof defining the circular cam track 100 having one end 103 disposed lower than the other end 104 thereof with the cam track means 100 bearing against the fixed member 101 at a point spaced radially outwardly from the axis of rotation of the control knob 78A and rotatable member 81A.

The disc portion 100 of the movable member 81 has an outwardly directed tongue 105 cooperable with the abutment means 97A previously described to limit rotational movement of the disc portion 100 in opposite directions.

The fixed member 101 has an end 106 received in a complementary recess 107 formed in an extension 108 of the end wall 71A of the housing member 13A. A leaf type spring 109 is provided and has one end 110 fixed to the casing member of the housing member 13A and the other end 111 bearing against the fixed member 101 to tend to move the same toward the axis of rotation of the movable member 81A. However, a threaded adjusting member 112 is threadedly carried by the housing member 13A and has an end 113 adapted to abut the fixed member 101 on a side thereof opposite to the side that the end 111 of the spring means 109 engages the same whereby the position of the free end 114 of the member 101 that bears against the cam track means 102 of the movable member 81A can be set at the desired radial position relative to the axis of rotation of the movable member 81A by the adjusting member 112 in opposition to the force of the spring means 109.

The operation of the regulator means 10A is substantially identical to the regulator means 10 previously described except that rotation of the control knob 78A and, thus, rotation of the movable member 81A causes the cam track means of the regulator 10A to rotate relative to the fixed member 101 whereas in the regulator 10 previously described the cam track means comprises the fixed member. However, in both regulator means 10 and 10A a substantially circular cam track means is provided with the cooperating camming surfaces of the fixed and movable members being disposed at a relatively large radial distance from the axis of rotation of the movable member to permit accurate setting of the regulator 10 or 10A and, thus, the setting of the compression spring 65 or 65A for the purpose previously described.

Thus, it can be seen that not only does this invention provide improved means for accurately and infinitely varying the setting of a vacuum regulator or the like, but also this invention provides improved adjusting means for other devices as desired.

While the form of the invention now preferred has been disclosed as required by the statutes, other forms may be used, all coming within the scope of the claims which follow.

What is claimed is:

1. In a vacuum regulator having a movable valve means for opening and closing a vacuum source passage means leading to a chamber of said regulator that is to be interconnected to a vacuum utilizing means, the improvement comprising means for adjusting said regulator to select a predetermined vacuum condition to be maintained in said chamber by said movable valve means, said adjusting means having means to urge said valve means toward its passage means closing position with an infinitely varying force within certain limits, cam means for varying the force of said urging means within said limits thereof, said cam means comprising a fixed member and a movable member having a surface means camming against a surface means of said fixed member whereby the position of the movable member relative to the fixed member determines the force of said urging means, and rotatable control means for rotating said movable member relative to said fixed member to select said predetermined vacuum condition to be maintained in said chamber, said control means being splined to said movable member to cause said movable member to rotate in unison therewith while being axially moved relative thereto by said fixed member.

2. In a vacuum regulator as set forth in claim 1, said movable member having a tongue, said regulator having a pair of spaced stop means receiving said tongue therebetween to limit movement of said movable member in opposite directions.

3. In a vacuum regulator as set forth in claim 1, said urging means comprising a coiled compression spring.

4. In a vacuum regulator as set forth in claim 3, said movable member having a part thereof operatively interconnected to one end of said spring to vary the degree of compression thereof in relation to the axial position of said movable member relative to said regulator.

5. In a vacuum regulator as set forth in claim 4, said part of said movable member comprising an adjusting screw adjustable relative to said movable member.

6. In a vacuum regulator as set forth in claim 1, said fixed member comprising a cam track.

7. In a vacuum regulator as set forth in claim 6, said cam track comprising a strip of material disposed in substantially a coiled relation with one end being axially spaced relative to the other end thereof.

8. In a vacuum regulator as set forth in claim 7, one end of said cam track being fixed to said regulator and the other end thereof being free to move relative to said regulator.

9. In a vacuum regulator as set forth in claim 8, said coiled cam track having a natural tendency to have said ends move into the same plane, and an adjusting member carried by said regulator and engaging said free end of said coiled cam track to hold said free end in a selected axially spaced relation relative to said fixed end thereof.

10. In a vacuum regulator as set forth in claim 8, said movable member having a tongue provided with a free end defining said surface means thereof and bearing against said coiled cam track to be cammed thereby.

11. In a vacuum regulator as set forth in claim 1, said movable member having a cam track portion provided with on end axially spaced from the other end thereof.

12. In a vacuum regulator as set forth in claim 11, said movable member having a disc-shaped part with said cam track portion defining one side of said disc-shaped part and being substantially circularly disposed thereon.

13. In a vacuum regulator as set forth in claim 11, said fixed member being adjustable relative to said regulator to a selected position for bearing against said cam track portion of said movable member.

14. In a vacuum regulator as set forth in claim 1, one of said members comprising a substantially circular cam track.

15. In combination, a housing means, a selector means rotatably carried by said housing means, a movable member splined to said selector means to be rotatable in unison therewith while being axially movable relative to said housing means, a fixed member carried by said housing means, said members having surfaces cooperating with each other to provide a camming action therebetween, and compression spring means carried by said housing means to urge said movable member against said fixed member whereby rotation of said movable member relative to said fixed member by said selector means varies the force of said compression spring means.

16. A combination as set forth in claim 15 wherein said fixed member comprises a cam track.

17. A combination as set forth in claim 16 wherein said cam track comprises a strip of material disposed in substantially a coiled relation with one end being axially spaced relative to the other end thereof.

18. A combination as set forth in claim 17 wherein one end of said cam track is fixed to said housing means and the other end thereof is free to move relative to said housing means.

19. A combination as set forth in claim 18 wherein said coiled cam track has a natural tendency to have said ends moved into the same plane, and an adjusting member carried by said housing means and engaging said free end of said coiled cam track to hold said free end in a selected axially spaced relation relative to said fixed end thereof.

20. A combination as set forth in claim 18 wherein said movable member has a tongue provided with a free end defining said surface thereof and bearing against said coiled cam track to be cammed thereby.

21. A combination as set forth in claim 15 wherein said movable member has a cam track portion provided with one end axially spaced from the other end thereof.

22. A combination as set forth in claim 21 wherein said movable member has a disc-shaped part with said cam track portion defining one side of said disc-shaped part and being substantially circularly disposed thereon.

23. A combination as set forth in claim 21 wherein said fixed member is adjustable relative to said housing means to a selected position for bearing against said cam track portion of said movable member.

24. A combination as set forth in claim 15 wherein one of said members comprises a substantially circular cam track.

References Cited

UNITED STATES PATENTS

| 2,891,784 | 6/1959 | Taylor | 137—116.5 XR |
| 3,125,111 | 3/1964 | Daly | 137—116.5 XR |

WILLIAM F. O'DEA, *Primary Examiner.*

HAROLD W. WEAKLEY, *Assistant Examiner.*